United States Patent [19]

Engle

[11] Patent Number: 4,692,049
[45] Date of Patent: Sep. 8, 1987

[54] QUICK DISENGAGEMENT APPARATUS FOR POWER WHEEL MECHANISMS

[75] Inventor: James L. Engle, Auburn, Ind.
[73] Assignee: Auburn Gear, Inc., Auburn, Ind.
[21] Appl. No.: 743,794
[22] Filed: Jun. 12, 1985
[51] Int. Cl.[4] ............................................. F16D 1/06
[52] U.S. Cl. ..................................... 403/1; 403/324; 403/359
[58] Field of Search .................. 403/1, 324, 325, 328, 403/327, 322, 359, 105, 106, 317, 321, 355, 375, 378

[56] References Cited

U.S. PATENT DOCUMENTS

| | | | |
|---|---|---|---|
| 1,790,238 | 1/1931 | Klein | 403/328 |
| 2,117,947 | 5/1938 | De Rome et al. | 403/324 |
| 2,626,821 | 1/1953 | Bouget et al. | 403/106 |
| 2,926,034 | 2/1960 | Weaver | 403/328 |
| 3,070,390 | 12/1962 | Schröter et al. | 403/355 |
| 3,176,998 | 4/1965 | Parker | 403/327 |
| 3,184,258 | 5/1965 | Kapusta | 403/1 |
| 4,138,148 | 2/1979 | Zaremba | 403/322 |
| 4,453,852 | 6/1984 | Gilcrest | 403/1 |

Primary Examiner—Cornelius J. Husar
Assistant Examiner—Peter M. Cuomo
Attorney, Agent, or Firm—Pearne, Gordon, McCoy & Granger

[57] ABSTRACT

An improved quick disengagement apparatus is provided for selectively altering the positioning of an axially translatable member between an axially biased first position and a second position in opposition to said axial bias, and for releasably locking said translatable member in at least said second position. The mechanism is especially adapted for use with power wheel hub assemblies, such as may be commonly employed in vehicles and agricultural implements or the like, in which provisions are to be made for disengaging the hub from an associated power shaft. The apparatus in accordance with the present invention provides a housing, mountable to the hub assembly, which carries an axial plunger, engageable with a distal end of the axially translatable power shaft, and a transverse release plunger, acting under a yieldable bias to interlock with the axial plunger to retain the axial plunger in a position whereat the power shaft is disengaged from the hub assembly. Translation of the transverse release plunger in opposition to its yieldable bias releases the axial plunger so that the power shaft and the axial plunger may translate to the engaged position of the power shaft with respect to the hub.

12 Claims, 15 Drawing Figures

QUICK DISENGAGEMENT APPARATUS FOR POWER WHEEL MECHANISMS

BACKGROUND OF THE INVENTION

1. Field of the Invention

The present invention relates to mechanisms for selectively altering the axial positioning of a translatable member between an axially biased first position and a second position in opposition to said axial bias, and for releasably locking said translatable member in at least said second position. More particularly, the present invention provides an improved type of such a mechanism which may be readily manually operated so as to be especially adaptable for use with conventional power wheel hub assemblies of vehicles and implements.

2. Description of the Prior Art

In vehicles of several types and in certain agricultural implements, it is often advantageous to provide certain powered axles with mechanisms enabling a hub associated with such powered axle to selectively assume either a powered or a free-wheeling operating condition. Heretofore, several well-known mechanisms have been described in the prior art, each intended to cooperate with a power wheel hub assembly to selectively engage or disengage the hub from the axle. In such power wheel assemblies, a rotational motion of the axle is generally communicated to the hub by the engagement of a clutch plate carried by the axle with a matching plate carried by the which engages with a matching set of internal splines formed in the hub. In either case, when it is desired to provide for unpowered or "free-wheeling" rotation of the hub about the axle, the axle is typically formed as an axially shiftable power shaft, axially biased to maintain engagement of the friction clutch or splines.

Conventional hub disengagement assemblies associated with such mechanisms typically include a plunger, acting in a direction along the axis of the power shaft, which plunger is adapted to be axially shifted along with the power shaft, either outwardly under the influence of the bias upon the power shaft or inwardly in opposition to such bias. Means are typically provided to maintain the plunger in a substantially outwardly translated position, corresponding to a status of engagement of the power shaft with the hub, or an inwardly translated position, corresponding to an axial translation of the power shaft at which the power shaft is disengaged from the hub.

Several examples of known prior art have been heretofore available to perform the function of translating the axially shiftable power shaft between its engaged and disengaged positions. The simplest form employs a reversibly mounted plate having a projection on one side thereof. When the plate is mounted such that the projection extends outwardly from the hub, the axial bias applied to the axially shifted power shaft urges an extension affixed to or formed on the end of the axially shiftable power shaft to translate outwardly into a recess formed by the projection on the plate such that the power shaft is engaged with the hub for the communication of rotation thereto. When the plate is mounted onto the hub such that the projection is disposed inwardly with respect to the hub, the projection pushes the extension on the end of the axially shiftable power shaft in opposition to the bias and into an axially translated position whereat the power shaft is disengaged from the hub. It can be noted that the use of such an approach to switch from an engaged condition to a disengaged condition requires that the plate be removed, reversed, and remounted at each desired change from an engaged to a disengaged status, or the reverse.

The known prior art most nearly analogous to the present invention is represented by the hub disengaging apparatus described in U.S. Pat. No. 4,453,852. In the described apparatus, a housing is mounted to a hub so as to support a centrally disposed translatable plunger in a cavity of said housing such that said plunger is aligned to translate in concert with the distal end of an axially shiftable power shaft. The plunger is configured to have at least two diameters, the lesser diameter extending outwardly from the housing, whereas the greater diameter is restrained from further outward translation by the housing. The plunger is urged to this position by the typical axial bias acting on the power shaft, thereby allowing the power shaft to assume an engaged position with respect to the hub. At least one additional translatable plunger is disposed within an annular region of the housing such that said additional plungers are translatable along axes parallel to and equidistantly spaced apart from the axis of translation of the centrally disposed plunger. Each of said additional plungers, generally not exceeding two in number, are disposed within a respective generally cylindrical bore formed through the housing. Passages are formed radially between each bore containing an additional plunger and the cavity in which the central plunger translates. Said passages retain interlocking elements which, in the aforesaid engaged condition of the power shaft with the hub, rest against the greater diameter of the central plunger. Additionally, in said condition, said interlocking elements rest within grooves of reduced diameter formed appropriately in each of the additional plungers at an axial position of substantially maximum inward translation of each of the additional plungers. Each of the additional plungers is provided with a bias acting between the hub and each plunger urging each additional plunger in an outward direction. However, in the engaged condition, outward translation of the additional plungers is precluded by the interlocking elements resting against the greater diameter of the central plunger and constrained within their respective communicating passages so as to be held within the grooves of the additional plungers, thereby holding the additional plungers at their inwardly translated positions.

When it is desired to disengage the power shaft from the hub, the central plunger is inwardly depressed, in opposition to the axial bias exerted on the power shaft, through a distance sufficient to disengage the clutch or splines of the power shaft from the hub. During that portion of the inward translation of the central plunger in which the power shaft and hub retain some measure of engagement, the interlocking elements are held in their engaged positions by a longitudinal extent of the central plunger having the aforesaid greater diameter. When the power shaft reaches its disengaged position with respect to the hub, the lesser diameter axial extent of the central plunger is disposed axially adjacent the communicating passages holding the interlocking elements. Under urging of the biases acting on each of the additional plungers, the interlocking elements tend to be forced out of the grooves in the additional plungers by beveled shoulders of the grooves so as to translate through the communicating passages to rest against the lesser diameter of the central plunger. When the interlocking elements have so transversely translated as to be clear of the grooves in the additional plungers, the additional plungers are urged outwardly by their respective biases so as to bring a full diameter surface of each of the additional plungers into contact with its respective interlocking element, thereby holding the interlocking elements against the lesser diameter of the central plunger, precluding the central plunger from moving outwardly under urging of the axial bias applied to the power shaft. Thus the central plunger is locked in a disengaged position.

To return the disengaging apparatus to an engaged position, the additional plungers are simultaneously pushed inwardly, in opposition to their respective biases, until their respective grooves have been longitudinally translated to be aligned with the interlocking elements. Thereat the axial bias means acting on the power shaft urges the power shaft and the central plunger to translate in an outward direction which in turn causes the interlocking elements to ride along a beveled shoulder between the lesser and greater diameters of the central plunger so as to be transversely translated into the respective grooves of the additional plungers. When the interlocking elements are so fully translated, the central plunger may continue its outward axial translation, enabling the power shaft to become engaged with the hub, the additional plungers being retained in their inward positions by the interlocking elements as has been described above.

It can be readily observed from a more detailed study of U.S. Pat. No. 4,453,852 that such a design provides for rapid selection of either an engaged position or a disengaged position of the power shaft with respect to the hub, without resort to disassembly or reassembly of the disengaging apparatus. However, the complexity of such apparatus may tend to require significant fabrication costs. Moreover, significant effort is required during fabrication to ensure that the interlocking elements are capable of substantially free transverse translation which implies that the surfaces of the beveled shoulders of the grooves in the additional plungers and the shoulder between the lesser and greater diameters of the central plunger, together with the surfaces of the communicating passages through which the interlocking elements are transversely translatable, be of a low friction finish. Additionally, care must be taken during fabrication, use, and assembly so as to preclude the introduction of foreign materials which may impede the transverse translation of the interlocking elements or the axial translations of the several plungers.

SUMMARY OF THE INVENTION

A primary object of the present invention is to provide a quick disengagement apparatus for positively selecting the relationship of the hub assembly and the associated power shaft between an engaged condition thereof and a disengaged condition thereof, having reduced manufacturing complexity.

Another object of the present invention is to provide a quick disconnect apparatus wherein the disengaged condition of the power shaft with respect to the hub assembly may be positively established by a locking mechanism.

A further object of the present invention is to provide a quick disengagement apparatus which may be permanently mounted on the hub assembly.

Yet another object of the present invention is to provide a quick disengagement apparatus which may be quickly, conveniently, reliably, and manually actuated, even by feel in the dark, between the engaged condition and the disengaged condition.

A further object of the present invention is to provide a quick disengagement apparatus incorporating appropriate operational sealing protection to deter the introduction of foreign materials which may inhibit proper operation of the apparatus.

A still further object of the present invention is to provide a quick disengagement apparatus overcoming the above-noted limitations and disadvantages of the known prior art through reduction of manufacturing complexity, thereby providing a significant reduction in manufacturing costs.

These and other objects of the present invention which may become apparent from study of the present disclosure by those skilled in the art are provided by a quick disengagement apparatus comprising:

a housing, adapted to be bolted to a hub assembly so as to be axially aligned with the axis of rotation of the hub;

a disengagement plunger, having a substantially right circular cylindrical configuration, disposed to translate concentrically coaxially with the power shaft within the hub, said axial translation occuring through a substantially right circular cylindrical bore through said housing;

a release plunger, configured as a pair of right circular cylindrical segments separated by, and affixed to opposing end faces of a further right circular cylindrical segment having a lesser diameter, said release plunger being disposed to translate axially within a substantially right circular cylindrical cavity formed in said housing transverse to, and intersecting with, the cylindrical bore accepting the disengaging plunger, the center lines of the cylindrical bore accepting the disengaging plunger and the cavity accepting the release plunger intersecting orthogonally, the disengaging plunger including a slot formed longitudinally therein to accept the lesser diameter segment of the release plunger;

means for biasing the release plunger so as to engage one of the greater diameter segments thereof with a detent recess formed in the cylindrical surface of the disengaging plunger at a longitudinal position corresponding to an axial translation of the disengaging plunger at which the quick disengagement assembly mounted to a hub assembly results in establishing the position of the associated power shaft with respect to the hub in its disengaged position;

means for sealing the quick disengagement apparatus to a hub assembly; and means for slidably sealing the disengaging plunger and the release plunger within their respective cavities of the housing.

When mounted on a hub, the apparatus of the present invention provides for rapid and reliable manual actuation to select the positioning of the power shaft with respect to the hub between the engaged condition thereof and the disengaged condition thereof. Assuming that the quick disconnect assembly has been mounted such that the power shaft is disengaged from the hub, as briefly described above, the power shaft may be engaged with the hub by translating the release plunger in opposition to its bias means so as to release the greater diameter portion of the release plunger from the detent in the disengaging plunger, thereby enabling the axial bias conventionally urging the power shaft into engagement with the hub to translate the power shaft and the disengaging plunger in contact therewith longitudinally through the housing until the power shaft is fully engaged with the hub. Releasing the manual effort translating the release plunger in opposition to its bias allows the release plunger to contact a bearing surface and outward translation stop on the cylindrical surface of the disengaging plunger. To disengage the power shaft from the hub, the disengaging plunger is translated in opposition to the axial bias acting on the power shaft until the release plunger reaches the aforesaid detent position formed in the cylindrical surface of the disengaging plunger, whereat the bias means acting on the release plunger urges the release plunger into the detent, thereby locking the disengaging plunger in the disengaged position. Further details of preferred and alternate embodiments of the mechanism will be explained in the course of a description thereof which follows hereinafter.

BRIEF DESCRIPTION OF THE DRAWINGS

In the accompanying drawings:

FIG. 1a is a cross-sectional view taken centrally along a plane including axes of translation of disengaging and release plungers of a quick disengagement apparatus in accordance with the present invention;

FIG. 1b is across-section of a first form of adaptive end configuration of the disengaging plunger of FIG. 1a;

FIG. 1c is a cross-section of a second form of adaptive end configurations of the disengaging plunger of FIG. 1a;

FIG. 1d a cross-section of a third form of adaptive end configuration of the disengaging plunger of FIG. 1a FIG. 2 is an exploded perspective view of the quick disengagement apparatus in accordance with the present invention, including a fragmentary cross-sectional portion indicating the positions and relationships of the internal configuration of a housing of the present invention;

FIGS. 3a and 3b provide a plan view and a side cross-sectional view, respectively, of a truncated disengaging plunger utilized within the principal embodiment of the quick disengagement apparatus in accordance with the present invention;

DESCRIPTION OF THE PREFERRED EMBODIMENT

Figures 1A, 1B, 1C, 1D, 2, 3A, 3B:
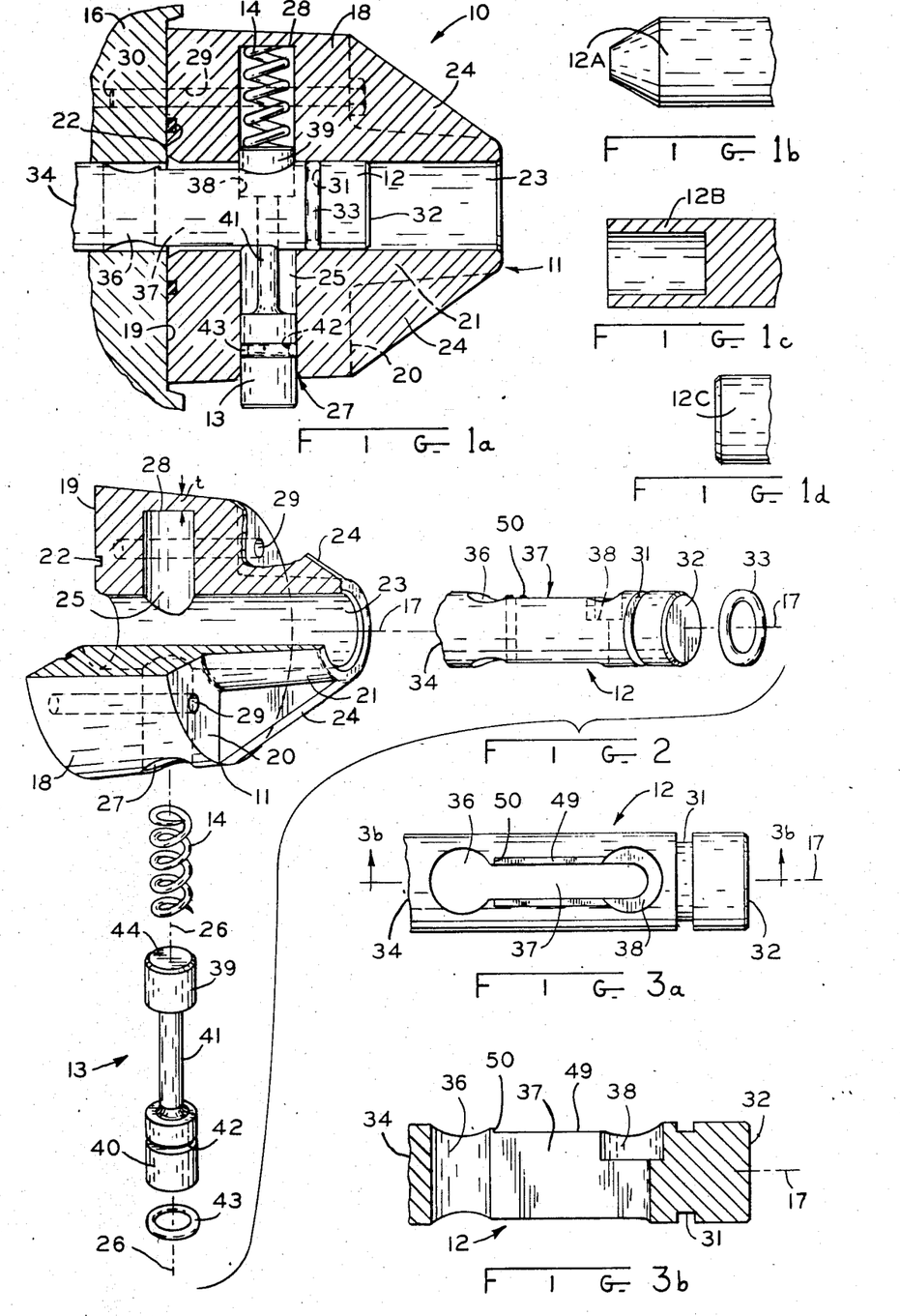

Referring first to FIG. 1a, a quick disengagement apparatus in accordance with the present invention is, as illustrated in longitudinal cross-section, indicated generally at 10. The quick disengagement apparatus 10 is comprised of a housing 11, an axial disengaging plunger 12 carried within the housing 11, a transverse release plunger 13 carried within the housing 11, and a yieldable biasing element 14 disposed to act on the transverse release plunger 13. The housing 11, carrying the axial disengaging plunger 12, the transverse release plunger 13 and the yieldable biasing element 14, is adapted to be appropriately mountable to a conventional hub assembly, fragmentarily illustrated at 16, in a manner to be more fully described hereinbelow.

Referring briefly to FIGS. 1b, 1c and 1d, alternate end portions 12A, 12B and 12C, respectively, are illustrated. Such end portions 12A, 12B and 12C are integrally formed extensions of the disengaging plunger 12 of FIG. 1a, extending leftwardly of the illustrated view of FIG. 1a. The end portion 12A is adapted to appropriately engage a first type of power axle associated with a conventional hub assembly, while the end portion 12B is adapted to appropriately engage a second type of power axle, each as will be more fully described hereinbelow. The end portion 12C, when incorporated as the end of the disengaging plunger 12, provides a planar surface adapted to abut against an extension of a power axle of either of the aforementioned types, which extension is typically present in existing conventional power hub assemblies.

Referring next to FIG. 2, wherein the quick disengagement apparatus 10 is shown in a perspective exploded view, the housing 11, which may be formed as a casting, is shown to be substantially symmetrical about a center line 17 passing therethrough, and includes a first portion 18 formed substantially as a cylinder having circular cross-section bounded by a substantially planar first end face 19 and a substantially parallel second end face 20, and a second substantially cylindrical portion 21 extending outwardly from said second end face 20 so as to be centered about said center line 17, the cylinder of said second portion 21 being longitudinally oriented along the center line 17. The diameter of the first end face 19 of the first portion 18 of the housing 11 is established to mate with a flat surface typically formed on an outer end of the hub assembly 16 (FIG. 1) which surface is perpendicular to an axis of rotation of the hub assembly. An annular groove 22 is formed in the end face 19 to accept a conventional sealing element to preclude the introduction of foreign matter or contaminants into the axial region between the end fact 19 and the flat surface of the associated hub assembly. The first portion 18 of the housing 11 may be tapered such that the second face 20 has a diameter less than that of the first face 19. The diameter of second portion 21 of the housing 11 is substantially less than the diameter of the second face 20 of the first portion 18. A substantially circular cylindrical hole 23, centered about the center line 17, is formed through the first portion 18 and the second portion 21 of the housing. The hole 23 may be machined as necessary to provide a smoth surface therethrough. The casting of the housing 11 may include a plurality of tapered flutes 24 in order to provide enhanced structural integrity to support the second portion of the housing 11 through its extension from the scond surface 20 of the first portion 18 of the housing 11.

The housing 11 further includes a tranverse cavity 25 formed therein, typically by a machining process. The cavity 25 is bored diametrically through the first portion 18 of the housing 11 on a center line 26 intersecting the center line 17 at right angles, the center line 26 being disposed in a suitable longitudinal position along the center line 17 between the first end face 19 and the second end face 20 of the first portion 18 of the housing 11. As indicated in the fragmentary cross-sectional portion of the illustration of the housing 11 shown in FIG. 2, the cavity 25 is formed to have a diametric extent within the first portion 18 of the housing 11 open through the cylindrical surface of the first portion 18 of the housing 11 at a first end 27, while a second end 28 of the cavity 54, opposed to said first end 27, is fully enclosed by the cylindrical surface of the first portion 18 of the housing 11 so as to provide a minimum thickness t of material of the housing 11 thereat. The diameter of the cavity 25 is constrained to be less than the diameter of the bore 23.

A plurality of mounting holes 29 are formed through the first portion 18 of the housing 11 between the first end face 19 and the second end face 20 thereof in a direction parallel with that of the center line 17, said mounting holes 29 being disposed between the flutes 24 in positions adapted to align with threaded mounting holes 30 (FIG. 1a) conventionally formed in the flat region of the hub assembly 16.

The axial disengaging plunger 12 is configured to have a substantially right circular cylindrical form, having a diameter adapted to enable the axial disengaging plunger 12 to slidably translate along the center line 17 through the bore 23 of the housing 11. In addition to the structural features of the axial disengaging plunger 12 to be described below, the axial disengaging plunger 12 includes a groove 31 formed circumferentially in its cylindrical surface proximate to, but spaced apart from, an end face 32 of the axial disengaging plunger 12 which, on assembly of the axial disengaging plunger 12 within the bore 23 of the housing 11, is proximate to a distal end of the second portion 21 of the housing 11. A slidable sealing element 33, typically a conventional 0-ring formed of a resilient material, may be assembled into the groove 31 of the axial disengaging plunger 12 such that an outer diameter of the element 33 will maintain frictional contact with the inner diameter of the bore 23 during translation of the axial plunger 12 along the center line 17.

Referring next to FIGS. 3a and 3b, further structural configuration of the axial disengaging plunger 12 may be described. The axial plunger 12 is bounded in its longitudinal extent by the first end face 32 and a second end 34 selected from among those illustrated in FIGS. 1a, 1b and 1c of said first end face 32 being a substantially planar surface oriented orthogonally witn respect to the center line 17. As illustrated in plan view in FIG. 3a, an assembly hole 36 is formed to pass through the axial disengaging plunger 12 so as to be centered about a diameter of the axial disengaging plunger 12 oriented perpendicularly with respect to the plane of FIG. 3a at a position longitudinally disposed along the axial disengaging plunger 12 with respect to the second end 34 appropriate to an assembly position to be described below. A longitudinal slot 37 is formed through the axial disengaging plunger 12 to extend, in a plane formed by the intersection of the axis of the assembly hole 36 and the center line 17 of the axial disengaging plunger 12, from the assembly hole 36 toward the first end face 32 of the axial disengaging plunger 12 through a longitudinal distance more fully defined below with reference to FIGS. 4, 5 and 6, the extent of said slot 37 being appropriately limited so as to preclude intersection of the slot 37 with the groove 31. A circular cylindrical cavity 38, having a diameter substantially equal to the diameter of the assembly hole 36, is formed partially through the axial disengaging plunger 12 along an axis parallel with the axis of the assembly hole 36. The cavity 38 is disposed longitudinally with respect to the axial disengaging plunger 12 so as to be substantially proximate to the end of the slot 37 nearest the first end face 32 of the axial disengaging plunger 12. FIG. 3b further illustrates the relationships between the assembly hole 36, the slot 37 and the cavity 38 through a central longitudinal cross-section of the axial disengaging plunger 12 taken through the plane B—B of FIG. 3a.

Referring again to the exploded perspective view of FIG. 2, the transverse release plunger 13 is shown to comprise a substantially right circular cylindrical element having a first right circular cylindrical portion 39 separated from a second right circular cylindrical portion 40 by a right circular cylindrical shaft portion 41. The axes of the first portion 39, the second portion 40 and the shaft portion 41 are co-linear and, for assembly purposes, are aligned with the center line 26 of tne transverse cavity 25 formed in the first portion 18 of the housing 11. The diameters of the first portion 39 and th second portion 40 are each substantially equal to the internal diameter of the transverse cavity 25 such that the transverse plunger 13 may slidably translate through the transverse cavity 25 along the center line 26. The diameter of the assembly hole 36 formed in the axial plunger 12 is established to be sufficient to enable the first portion 39 of the transverse plunger 13 to pass freely therethrough. The shaft portion 41 of the transverse plunger 13 is configured to have a diameter less than the diameter of either the first portion 39 or the second portion 40 of the transverse plunger 13. The width of the longitudinal slot 37 formed in the axial plunger 12, as measured in a direction perpendicular to both its longitudinal extent and its diametric passage through the axial disengaging plunger 12, is established to be sufficient to permit the shaft portion 41 of the transverse plunger 13, when the shaft portion 41 is oriented such that its axis is perpendicular to the plane of FIG. 3a, to slidably translate within the slot 37 in either longitudinal direction with respect to the axial disengaging plunger 12. The second portion 40 of the transverse plunger 13 includes a circumferential groove 42 into which a slidable seal element 43 may be assembled. Typically the slidable seal element 43 may be a conventional 0-ring, appropriately sized to have an outer diameter sufficient to maintain frictional sliding contact with the inner diameter of the transverse cavity 25 when the transverse plunger 13 is appropriately assembled therein. The yieldable biasing element 14, illustrated as a compressable coil spring, is insertable within the transverse cavity 25 so as to be disposed between the closed end 28 of the transverse cavity 25 and a distal end surface 44 of the first portion 39 of the transverse plunger 13.

Figure 4:
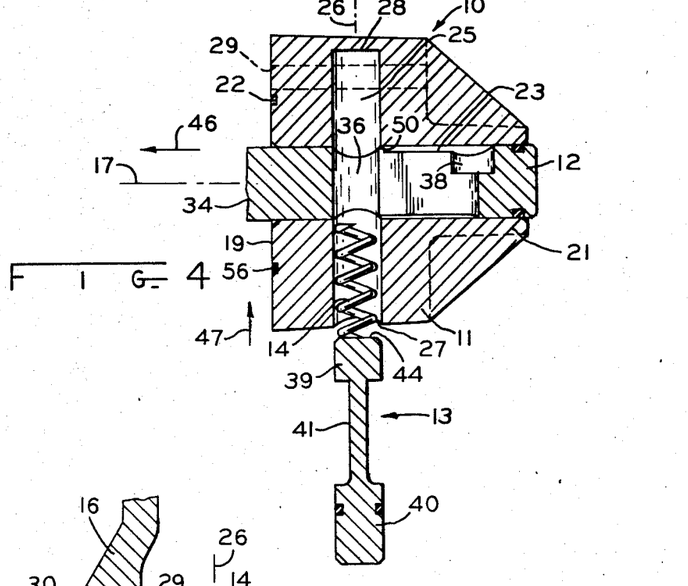
FIG. 4 is a partially exploded longitudinal cross-section view of the quick disengagement apparatus in accordance with the present invention, illustrating an intermediate state of assembly thereof.
Figure 5:
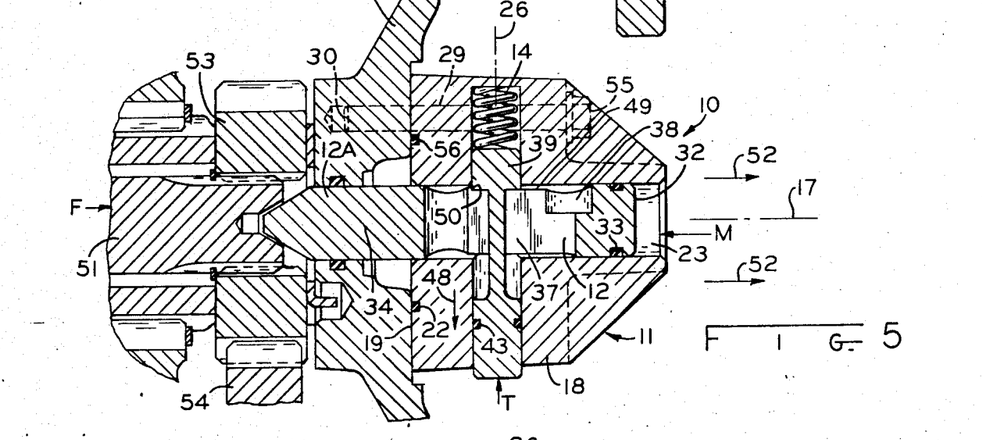
FIG. 5 is a longitudinal cross-sectional view of the quick disengagement apparatus in accordance with the present invention, as installed with respect to a representative power shaft and hub assembly, illustrating an engaged position thereof.

Referring next to FIG. 4, assembly of the quick disengagement apparatus 10 may be accomplished by translating the axial disengaging plunger 12 longitudinally along the center line 17 of the bore 23 through the housing 11 in the direction of an arrow 46 such that the second end 34 of the axial disengaging plunger 12 first enters the bore 23 at the distal end of the second portion 21 of the housing 11. The axial disengaging plunger 12 is then further translated in the direction indicated by the arrow 46 and is rotationally oriented about the center line 17 such that the axis of the assembly hole 36 through the axial disengaging plunger 12 is aligned with the center line 26 of the transverse cavity 25 formed in the housing 11. While maintaining this relative positional reltionship between the axial disengaging plunger 12 and the housing 11, the yieldable biasing element 14 may then be inserted, in the direction of an arrow 47, into the transverse cavity 25 through its open end 27. The transverse plunger 13 may then be inserted, in the direction of the arrow 47, into the open end 27 of the transverse cavity 25 such that the first portion 39 of the transverse plunger 13 recedes the remainder of the transverse plunger 13 in entering into the opening 27. By applying a manual force T, as shown in FIG. 5, to the distal end of the second portion 40 of the transverse plunger 13, the transverse plunger 13 may be translated in the direction indicated by the arrow 47 through the transverse cavity 25 of the housing 11 and through the assembly hole 36 of the axial disengaging plunger 12 such that the yieldable biasing means 14 is compressed between the inner surface of the closed end 28 of the transverse cavity 25 and the first face 44 of the first portion 39 of the transverse plunger 13. When the first portion 39 of the transverse plunger 13 has completely translated, in the direction indicated by the arrow 47, through the assembly hole 36 of the axial plunger 12 such that the transverse plunger 13 is positioned along the center line 26 to be slightly upwardly from the position illustrated in FIG. 5, then the axial disengaging plunger 12 may be further translated through the axial bore 23 through the housing 11 in the direction indicated by the arrow 46 until the axial disengaging plunger 12 is substantially in the position illustrated in FIG. 5. On removal of the external force T applied to the distal end of the second portion 40 of the transverse plunger 13, the yieldable biasing element 14 urges the transverse plunger 13 to translate in a direction indicated by an arrow 48 of FIG. 5 until the first portion 39 of the transverse plunger 13 comes into frictional contact with a bearing surface 49 on the axial disengaging plunger 12 adjacent the slot 37. Translation of the axial disengaging plunger in a direction counter to that indicated by the arrow 46 so as to bring the assembly hole 36 into alignment with the transverse cavity 25 is precluded by contact of the first portion 39 of the transverse plunger 13 with a shoulder 50 formed on the surface of the axial disengaging plunger 12 thereby maintaining the axial disengaging plunger 12 in its assembled position. Disassembly of the quick disengagement apparatus for maintenance, repair or replacement of the components thereof, may be readily accomplished by translating the transverse plunger 13 in a direction indicated by the arrow 47 of FIG. 4 against the yieldable bias element 14 until the first portion 39 of the transverse plunger 13 clears the shoulder 50 on the axial plunger 12 and then translating the axial disengaging plunger 12 in a direction counter to that indicated by th arrow 46 of FIG. 4 until the assembly hole 36 is again aligned with the center line 26 of the transverse cavity 25.

Referring next to FIG. 5, the manner of installation of the quick disengagement apparatus 10, and the operation of the apparatus 10 providing an interaction with a typical axially shiftable power shaft and hub assembly, may be described. In a representative conventional power wheel assembly, a hub assembly 16 is generally independently supported for rotation about an axis 17 by appropriately disposed bearings (not illustrated). An axially shiftable driven power shaft 51 is provided with a yieldable bias, indicated by the force F, urging the power shaft 51 in a direction indicated by an arrow 52 such that a gear 53 is engaged internally by splines formed on the end of said power shaft 51 so as to rotate therewith about the axis 17. A planetary gear train, indicated in part as 54, operably coupled to the hub assembly 16 is engaged with the gear 53 such that a driven rotation of the power shaft 51 about the axis 17 produces a like rotation of the hub assembly 16. The quick disengagement apparatus 10, in accordance with the present invention, assembled in the aforesaid manner, is mounted to the hub assembly 16 by passing bolt means 55 through the mounting holes 29, formed through the first portion 18 of the housing 11, into engagement with available threaded holes 30 formed in the hub assembly 16 so as to provide for alignment of the axis of the axial disengaging plunger 12 with the axis 17 of the power shaft 51. A distal end of the power shaft 51 is typically provided with a machining centering indentation. As illustrated in FIG. 5, the end 34 of the axial disengaging plunger 12 may be adapted as in FIG. 1b to include an end portion 12A to longitudinally extend between the distal end of the power shaft 51, when the power shaft 51 is in its engaged position, and the balance of the axial disengaging plunger 12, when translated in the direction of the arrow 42 until the shoulder 50 on the axial disengaging plunger 12 abuts against the first portion 39 of the transverse plunger 13. A conventional 0-ring 56, of an appropriate size, may be placed within the groove 22 formed in the end face 19 of the first portion 18 of the housing 11 during mounting of the quick disengagement apparatus 10 to the hub assembly 16.

Figure 6:
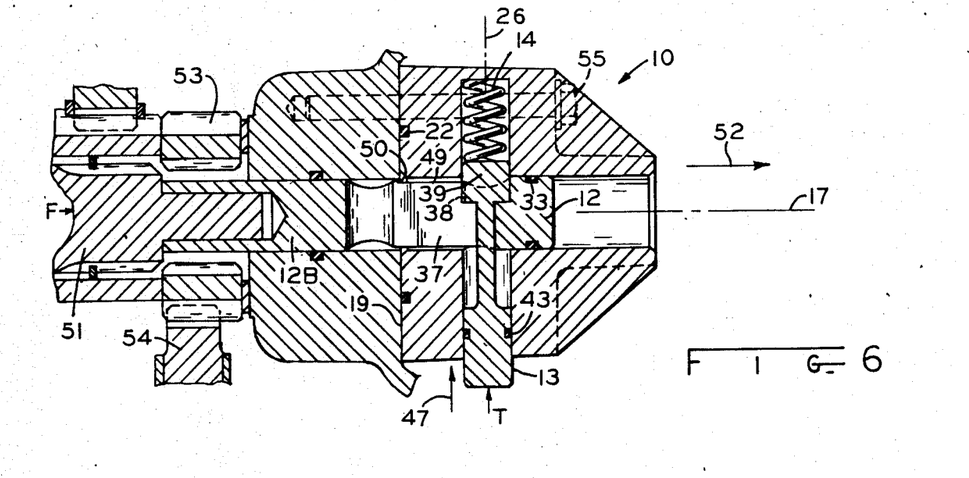
FIG. 6 provides the view of FIG. 5 when the quick disengagement apparatus in accordance to the present invention is in its disengaged position.

Referring next jointly to FIGS. 5 and 6, the manner of operating the quick disengagement apparatus 10 of the present invention to accomplish shifting the axially shiftable power shaft 52 from an engaged cndition to a disengaged condition and the reverse, may be described. Assuming initially that the power shaft 51 is in its engaged condition, as shown in FIG. 5, a transition to the disengaged condition may be accomplished by imposing an external force M to the first end face 32 of the axial disengaging plunger 12, in the direction indicated, in opposition to the force F exerted by the axial yieldable bias applied to the power shaft 51. This auses the axial disengaging plunger 12 to translate in a direction counter to that indicated by the arrow 51 against said axial yieldable bias and the frictional contact between the first portion 39 of transverse plunger 13 on the bearing surface 49 of the axial disengaging plunger 12 adjacent the slot 37 which causes the second end 34 of the axial disengaging plunger 12, end portion 12A, to abut against the distal end of the power shaft 51 which in turn causes the power shaft 51 to translate in a direction counter to that indicated by the arrow 52. When the translation of the axial disengaging plunger 12 and the power shaft 51 has progressed sufficiently in a direction counter to that indicated by the arrow 52 such that the splines on the end of the power shaft 51 are fully disengaged from contact with the gear 53, the cavity 38 formed in the axial disengaging plunger 12 reaches a longitudinal position within the bore 23 through the housing 11 substantially centered at the axis 26 of the transverse cavity 25 of the housing 11. Thereat, the yieldable bias element 14 urges the transverse plunger 13 to translate in the direction indicated by the arrow 48 of FIG. 5 such that the first portion 39 of the transverse plunger 13 becomes seated within the cavity 38 in the axial disengaging plunger 12, as illustrated in FIG. 6. In such configuration, the axially shiftable power shaft 51 is held in its disengaged condition in opposition to the yieldable bias F by the interlocking of the transvere plunger 13 with the axial plunger 12. The externally applied force M may then be removed from application to the first end face 32 of the axial disengaging plunger 12. In the disengaged condition illustrated in FIG. 6, the hub assembly 16 is then free to rotate independently of the rotation of the power shaft 51, thereby removing any communication of driven rotational power to the hub assembly 16.

The engaged or coupled condition illustrated in FIG. 5 may be readily restored, with reference to FIG. 6, by application of an external force T to the distal end of the second portion 40 of the transverse release plunger 13 sufficient to overcome the opposition of the yieldable biasing element 14 together with any frictional forces exerted by the contact of the first portion 39 of the transverse plunger 13 with the cylindrical surfaces of the cavity 38 formed in the axial disengaging plunger 12, thereby translating the transverse plunger 13 along the axis 26 in a direction indicated by an arrow 47 until the first portion 39 of the transverse plunger 13 becomes disengaged from the cavity 38 formed in the axial disengaging plunger 12. Thereat, the force F imposed on the axially translatable power shaft 51 by its yieldable bias causes the axially translatable power shaft 51 to translate in the direction indicated by the arrow 52 until the engaged condition illustrated in FIG. 5 is reached. In FIG. 6, the interface between the distal end of the axially translatable power shaft 51 and the axial disengaging plunger 12 is illustrated to consist of a second type of end of the power shaft 51 and an axial disengaging plunger 12 having its distal end in the form of the end 12B, shown in FIG. 1c. The translation of the axially translatable power shaft 51 acting on the end 12B of the axial disengaging plunger 12 causes the axial disengaging plunger 12 to translate in the direction indicated by the arrow 52 until it reaches the position illustrated in FIG. 5. Removal of the externally applied force T from the distal end of the second portion 40 of the transverse plunger 13 allows the yieldable biasing element 14 to again urge the first portion 39 of the transverse plunger into frictional contact with the bearing surface 49 of the axial disengaging plunger 12 adjacent the slot 37.

As may be noted from FIGS. 5 and 6, the inclusion of the slidable sealing elements 33 and 43 on the axial plunger and transverse plunger, respectively, inhibits the inadvertent introduction of foreign matter into the region of interlocking operation between the axial disengaging plunger 12 and the transverse plunger 13 at either the engaged condition or the disengaged condition, or during transitions therebetween.

It should be recognized that the specific forms of power hub assemblies to which a quick disengagement apparatus 10 in accordance with the present invention are often conventionally provided with extension members (not illustrated) which adapt either the distal end form of the power shaft 51 illustrated in FIG. 5 or the distal end of the power shaft 51 illustrated in FIG. 6 to the disengaging mechanisms known in the prior art. In order to provide for the incorporation of such existing power shaft extending elements, the present invention contemplates providing an axial disengaging plunger 12 of FIG. 1a wherein the second end 34 is configured to be truncated as a substantially planar surface forming an end 12C, as illustrated in FIG. 1d. The overall length of such an axial disengaging plunger 12 is therein appropriately established such that the assembly and functional relationships of the elements of the quick disengagement apparatus 10 are maintained as heretofore described.

Figure 7A:
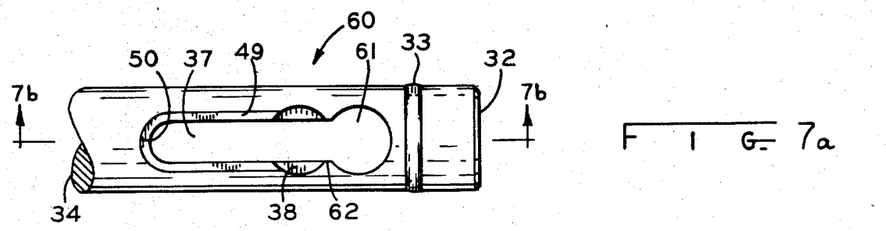
FIGS. 7a and 7b provide a plan view and a side cross-sectional view, respectively, of a truncated alternate embodiment of a disengaging plunger utilized in the quick disengagement apparatus in accordance with the present invention.
Figure 7B:
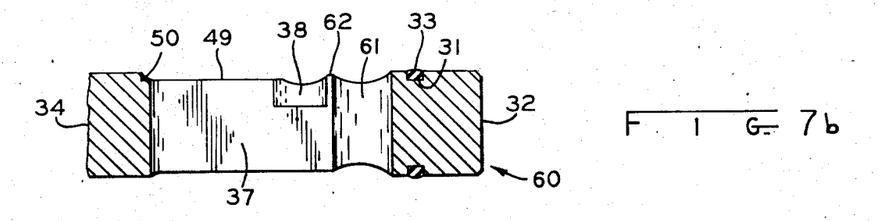

Referring next to FIGS. 7a and 7b, a first alternative embodiment of an axial disengaging plunger is indicated generally at 60. The axial disengaging plunger 60 may be readily observed to be substantially interchangeable with the axial disengaging plunger 12 heretofore described. As has heretofore been established, the axial disengaging plunger 60 is formed as a substantially right circular cylinder having a first end face 32, a second end 34, which may be of either of the forms illustrated in FIGS. 1b, 1c or 1d, said axial disengaging plunger 60 having a slot 37 formed diametrically therethrough to extend axially between a shoulder 50 defining an engaged position and a detent cavity 38 defining a disengaged position, and including a groove 33 for receiving a conventional sealing 0-ring. However, in the axial disengaging plunger 60, an assembly hole 61 is formed diametrically through the axial disengaging plunger 60 at an axial position proximate to the first end face 32 so as to be disposed between the detent cavity 38 and the seal receiving groove 33. The axis of the assembly hole 61 is oriented to be parallel with the slot 37. The slot 37 is thereon extended toward the first end face 32 so as to fully intersect the assembly hole 61. A surface or ledge 49 (FIG. 7a) is provided to receive in sliding engagement the annular radial surface on the underside of the large diameter portion 39 of the plunger 13.

The manner of assembly and operation of the quick disengagement apparatus 10 incorporating the axial disengaging plunger 60 is substantially identical with that heretofore described. However, with reference to FIG. 4, after alignment of the assembly hole 61, both longitudinally and rotationally, with the transverse cavity 25 of the housing 11, and after insertion of the transverse biasing element 14 and the transverse plunger 13, as described above, the axial disengaging plunger 60 would first be translated in a direction counter to that indicated by the arrow 46 of FIG. 4 to attain the assembled status.

Figure 8A:
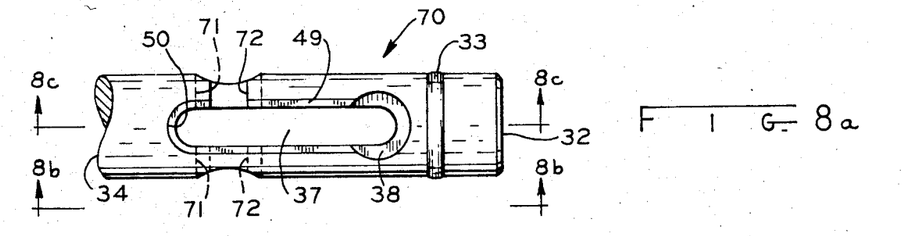
FIGS. 8a, 8b and 8c provide a plan view, a side cross-sectional view, and a side view, respectively, of a truncated second alternate embodiment of a disengaging plunger utilized in the quick disengagement apparatus in accordance with the present invention.
Figure 8B:
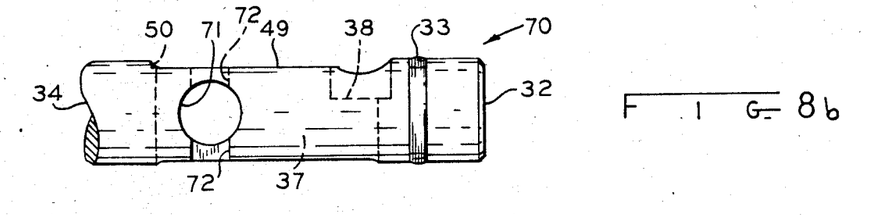
Figure 8C:
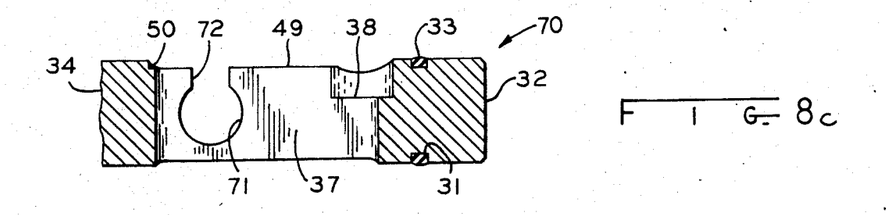

Referring next to FIGS. 8a, 8b and 8c, a second alternative embodiment of the axial disengaging plunger is indicated generally at 70. The axial disengaging plunger 70 differs from either of the heretofore described embodiments in that an assembly hole 71 is formed diametrically through the axial disengaging plunger 70 at right angles to the slot 37. The axial position of the assembly hole 71 along the extent of the axial disengaging plunger 70 is such that it is disposed at any convenient position between the shoulder 50 bounding the slot 37 on an end proximate to the end 34 of the axial disengaging plunger 70 and the detent cavity 38 formed at the end of the slot 37 proximate to the first end face 32 of the axially disengaging plunger 70. A pair of diametrically opposed, circumferentially extending slots 72 are formed in a pair of diametrically opposed quadrants of the circular cross-section of the axial disengaging plunger 70 so as to link the assembly hole 71 with the slot 37. The longitudinal dimension of the slot 72 is substantially equivalent to the diameter of the central shaft portion 41 of the transverse plunger 13 illustrated in FIG. 4.

The axial disengaging plunger 70 may be assembled into the housing 11 of the quick disengagement apparatus 10 in lieu of the axial disengaging plunger 12 illustrated in FIG. 4. With reference to FIG. 4, and FIGS. 8a through 8c, the axial disengaging plunger 70 is assembled into the quick disengagement apparatus 10 by inserting it into the bore 23 such that the second end 34 of the axial disengaging plunger 70 first enters the axial bore 23 of the housing 11 from the distal end of the second portion 21 of the housing 11. The axial disengaging plunger 70 is then translated in a direction indicated by the arrow 46 and is appropriately rotated in orientation such that the assembly hole 71 is aligned with the transverse bore 25 of the housing 11. The transverse biasing element 14 and the transverse plunger 13 are then inserted as has been heretofore described. When the transverse plunger 13 has been translated in a direction indicated by the arrow 47 to a point whereat the first portion 39 of the transverse plunger 13 has progressed totally through the assembly hole 71 of the axial disengaging plunger 70, the axial disengaging plunger 70 is rotated about its axis through ninety degrees in a manner such that the slots 72 receive and permit the rotational relative motion of the shaft portion 41 of the transverse plunger to become aligned with the slot 37. Subsequently, any force tending to translate the transverse plunger 13 in the direction of the arrow 47 is removed, whereby the action of the transverse biasing element 14, acting between the closed end 28 of the transverse cavity 25 of the housing 11 and the first surface 44 of the first end portion 39 of the transverse element plunger 13, causes the first portion 39 of the transverse plunger 13 to contact the bearing surface 49 formed adjacent the slot 37 of the axial disengaging plunger 70. The operation of a quick disengagement apparatus 10 incorporating an axial disengaging plunger 70 is, after the aforesaid assembly, substantially identical with either of the above-described embodiments. Clearly, in an axial disengaging plunger of the embodiment illustrated in FIGS. 8a through 8c, assembly holes parallel to the slot 37, such as the assembly hole 36 of the principal embodiment and assembly hole 61 of the first alternate embodiment, are not necessary, whereby the overall length of the axial disengaging plunger 70 may be shortened in a direction toward the first end face 32, which in turn will enable shortening of the second portion 21 of the housing 11. Such an arrangement enables minimizing the extent to which the quick disengaging apparatus 10 in accordance with the present invention protrudes from the surface of the hub assembly 16.

As a further alternate embodiment, the axial disengaging plunger illustrated in FIGS. 8a through 8c may be further modified by omitting the assembly hole 71 and the slots 72 communicating therewith, thus providing an axial disengaging plunger without an assembly hole. To accommodate assembly of a quick disengaging apparatus 10 utilizing such an axial disengaging plunger, the transverse plunger is modified, with reference to FIG. 2, by providing that the first cylindrical portion 39 of the transverse plunger 13 is removably assembled, such as by threading, to the shaft portion 41. The transverse bias member 14 and the first end portion 39 are then inserted into the closed end 28 portion of the transverse cavity 25 formed in the housing 11 to an extent sufficient to enable the free passage of the axial disengaging plunger through the axial hole 23. When the axial disengaging plunger has been inserted, it may then be rotated to align the slot 37 with the axis 26 of the transverse cavity 25, in an orientation wherein the bearing surface 49 adjacent the slot 37 on the axial disengaging plunger is proximate to the first end portion 39 of the transverse plunger. Subsequently, the shaft portion 41 and the second end portion 40 of the transverse plunger are inserted into the open end 27 of the transverse cavity 25 in the housing 11 so as to matingly engage the distal end of the shaft portion 41 with the first end portion 39, thereby forming the illustrated transverse plunger 13.

While there have been described above the principles of this invention in connection with specific apparatus, it is to be clearly understood that this description is made only by way of example and not as a limitation to the scope of the invention.

What is claimed is:

1. A quick disengagement apparatus for selectively controlling a conventional disengageable power wheel assembly wherein an axially shiftable power shaft may be translated from a first position whereat said power shaft is operatively engaged with an associated hub assembly to enable mutual coaxial rotation, to, in opposition to a yieldable bias acting axially on said power shaft, maintain said engagement, a second position whereat said power shaft is disengaged from its associated hub assembly to enable independent coaxial rotations thereof, said quick disengagement apparatus comprising:

a housing, disposed in a fixed location relative to said hub assembly;

axial translatable means, carried by said housing, for communicating an axially directed external force applied thereto to said power shaft in opposition to said yieldable bias acting thereon so as to cause said power shaft to assume its disengaged position, said axially translatable means including a shoulder surface and a detent cavity formed therein at appropriate longitudinal positions respectively corresponding to said engaged and disengaged positions;

transversely translatable means, carried by said housing, for releasably interlocking with said detent cavity and for retaining said axially translatable means in its axially translated position whereat said power shaft is disengaged from said hub assembly, release of said interlocking enabling said axially translatable means to translate to its axially translated position whereat said power shaft is engaged with said hub assembly;

means for yieldably biasing said transversely translatable means into interlocking engagement with said detent cavity of said axially translatable means when said axially translatable means has attained said disengaged condition; and said axially translatable means further including a longitudinal slot formed diametrically therethrough at a laterally central region, the transversely translatable means extending through said slot and being supported in said housing on opposite sides of said axially translatable means, the slot enabling said axially translatable means to be shifted with respect to said transversely translatable means at least between its engaged position and its disengaged position, the assembly of the transversely translatable means through the slot of the axially translatable means allowing the transversely translatable means to serve as the sole means for retaining the axially translatable means in the housing.

2. A quick disengagement apparatus as claimed in claim 1, wherein said axially translatable means further includes an assembly hole, diametrically formed therethrough orthogonally to said longitudinal slot at a longitudinal position intermediate of said engaged and disengaged positions of said axially translatable means, and a pair of radially extending, diametrically opposed notches, circumferentially extending through opposed quadrants so as to form a communicating passage between said assembly hole and said longitiudinal slot, whereby disassembly is accomplished by translating said axially translatable means to the position of said assembly hole whereat said axially translatable means is rotatable about its axis through 90 degrees.

3. A quick disengagement apparatus as claimed in claim 1, wherein said transversely translatable means is configured substantially as a pair of substantially equal diameter right circular cylinders rigidly mounted on opposing ends of a right circular cylindrical shaft, said shaft being adapted to slidably pass through said longitudinal slot of said axially translatable means, said right circular cylinders having diameters precluding their passage through said slot.

4. A quick disengagement apparatus as claimed in claim 3, wherein a first said right circular cylinder, being first to enter said housing, on assembly thereof, is removably affixed to a corresponding end of said cylindrical shaft.

5. A quick disengagement apparatus as claimed in claim 1, further comprising means for slidably sealing said axially translatable means and said transversely translatable means during their respective translations within said housing.

6. A quick disengagement apparatus as claimed in claim 1, further comprising means for sealing an interface between said quick disengagement apparatus and said hub assembly to which it is mounted from contaminant introduction.

7. A quick disengagement apparatus for selectively controlling a conventional disengageable power wheel assembly wherein an axially shiftable power shaft may be translated from a first position whereat said power shaft is operatively engaged with an associated hub assembly to enable mutual coaxial rotation, to, in opposition to a yieldable bias acting axially on said power shaft, maintain said engagement, a second position whereat said power shaft is disengaged from its associated hub assembly to enable independent coaxial rotations thereof, said quick disengagement apparatus comprising:
- a housing, disposed in a fixed location relative to said hub assembly;
- axial translatable means, carried by said housing, for communicating an axially directed external force applied thereto to said power shaft in opposition to said yieldable bias acting thereon so as to cause said power shaft to assume its disengaged position, said axially translatable means including a shoulder surface and a detent cavity formed therein at appropriate longitudinal positions respectively corresponding to said engaged and disengaged positions;
- transversely translatable means, carried by said housing, for releasably interlocking with said detent cavity and for retaining said axially translatable means in its axially translated position whereat said power shaft is disengaged from said hub assembly, release of said interlocking enabling said axially translatable means to translate to its axially translated position whereat said power shaft is engaged with said hub assembly;
- means for yieldably biasing said transversely translatable means into interlocking engagement with said detent cavity of said axially translatable means when said axially translatable means has attained said disengaged condition; and
- said axially translatable means further including a longitudinal slot formed diametrically therethrough for enabling said axially translatable means to be shifted with respect to said transversely translatable means at least between its engaged position and its disengaged position, said slot being adapted to enable said transversely translatable means to pass longitudinally along said slot, said longitudinal slot further including an assembly hole diametrically formed through said axially translatable means, said assembly hole having its axis in alignment with said slot, said assembly hole allowing said transversely translatable means to pass diametrically through said axially translatable means during assembly of the apparatus within the housing, said assembly hole being disposed in a longitudinal position along said slot such that, to accomplish disassembly, said axially translatable means is required to be shifted from its disengaged position to a position of said assembly hole beyond that of its engaged position.

8. A quick disengagement apparatus as claimed in claim 7, wherein said axially translatable means is further formed with said shoulder disposed between said engaged position and said assembly hole to preclude inadvertent translation of said axially translatable means therebetween.

9. A quick disengagement apparatus for selectively controlling a conventional disengageable power wheel assembly wherein an axially shiftable power shaft may be translated between a first position whereat said power shaft is operatively engaged with an associated hub assembly to enable mutual coaxial rotation, and, in opposition to a yieldable bias acting axially on said power shaft so as to maintain said engagement, a second position whereat said power shaft is disengaged from its associated hub assembly to enable independent coaxial rotations thereof, said quick disengagement apparatus comprising:
- a housing, substantially configured to have a first portion in the form of a cylinder having a circular face and a circular base parallelly spaced apart from said face by an appropriate axial extent, said face having a diameter less than or equal to the diameter of said base, a second portion formed as a right circular cylinder extending outwardly from, and centered with respect to, said face, and a plurality of tapered flutes extending from the periphery of said face to a distal end of said second portion;
- a circular cylindrical hole formed axially through said first and said second portions of said housing;
- a substantially circular cylindrical cavity formed on a diameter of said first portion, disposed substantially between said base and said face, said cavity being closed at one end thereof;

at least two circular cylindrical holes formed through said first portion of said housing from said face through said base such that their axes are parallel with, and equally spaced apart from, the axis of said housing, said holes being appropriately disposed so as be to situated between said flutes, and adapted to align with means, associated with said hub assembly, for mounting said housing to said hub assembly;

a transverse plunger, integrally formed to have a first portion configured as a right circular cylinder, a second portion configured as a right circular cylinder, and a right circularly cylindrical shaft portion extending therebetween, said first and said second portions having substantially equal diameters greater than a diameter of said shaft portion, said first and said second portions being adapted to slidably translate, in their axial direction, within said transverse cavity formed in said housing, said first portion being proximate to the closed end of said cavity, and said second portion including a circumferential groove formed therein;

yieldable biasing means, disposed within said transverse cavity of said housing between said closed end thereof and said first cylindrical portion of said transverse plunger, for urging said transverse plunger to slide within said cavity in a direction away from said closed end thereof; and an axial plunger, formed substantially as a right circular cylinder having a diameter adapted to slidably translate, in an axial direction, through said axial hole formed through said housing, said axial plunger having a second end proximate, when said axial plunger is assembled into said housing, to said base of said housing, and a first end face opposed thereto in a direction of said second portion of said housing, said axial plunger having a circumferential groove formed proximate to said first end face and a longitudinal slot formed diametrically through said cylinder, said slot having a width adapted to accept said shaft portion of said transverse plunger in slidable engagement therethrough when the axis of said shaft portion is aligned in the plane of said slot and orthogonal to the longitudinal axis of said axial plunger, said slot terminating, at its end proximate to said second end of said axial plunger, in a circular assembly hole diametrically formed through said axial plunger, said hole having its axis in a plane bisecting said slot in a longitudinal direction, said hole having a diameter substantially equal to the diameter of said transverse cavity formed in said housing, said slot terminating at its obverse end proximate to said first end face, but not intersecting said circumferential groove, in a right circular cylindrical cavity formed radially inwardly of the circumferential surface of said axial plunger, said cavity forming a detent adapted to accept said first cylindrical portion of said transverse plunger, said axial plunger further having a substantially planar bearing surface formed inwardly of its circumference adjacent each side of said slot, said bearing surfaces extending longitudinally of said slot from said right circular cylindrical cavity to a shoulder formed adjacent the intersection of said slot with said circular assembly hole, through said axial plunger;

said housing, said axial plunger, said transverse plunger and said yieldable biasing means cooperating for assembly such that said axial plunger may be translated within the axial bore through said housing and rotationally aligned with respect to said housing such that said assembly hole formed on the end of said slot proximate to said second end of said axial plunger is aligned with said transverse cavity formed in said housing and said bearing surfaces are proximate to the closed end of said transverse cavity, whereat said yieldable biasing means may be inserted into said transverse cavity so as to abut against said closed end thereof and said transverse plunger may be slidably translated into said transverse cavity such that said first cylindrical portion thereof abuts against said yieldable biasing means, whence an external force applied to second cylindrical portion of said transverse plunger so as to cause said transverse plunger to translate in opposition to said yieldable biasing means translates said first cylindrical portion of said transverse plunger within said transverse cavity until said first cylindrical portion of said transverse plunger has been translated completely through said axial plunger, whereat said axial plunger may be translated through said housing toward said base such that said slot of said axial plunger slidably engages said shaft portion of said transverse plunger, whereat removal of the force applied to said second cylindrical portion of the transverse plunger enables said yieldable biasing means within said transverse cavity of the housing to urge the first cylindrical portion of the transverse plunger into slidable contact with said bearing surface of said axial plunger adjacent said slot; and said housing, said axial plunger, said transverse plunger, and said yieldable biasing means cooperating, on mounting of the quick disengagement assembly, as so assembled, to its associated hub assembly, such that said second end of said axial plunger is in abutting contact with a distal end of said power shaft, when said power shaft is in its fully engaged position with respect to said hub assembly, whereat an external force may be applied to said first end face of said axial plunger so as to cause said axial plunger and said power shaft to translate, in opposition to the yieldable bias applied to said power shaft, from said engaged position to a position whereat said power shaft is disengaged from said hub assembly, at which position said yieldable bias means within said transverse cavity urges said first cylindrical portion of said transverse plunger into the cavity formed at the obverse end of the slot of the axial plunger so as to retain the axial plunger in the disengaged position, said engaged condition being restored through translation of said transverse plunger, through application of a second external force in opposition to said yieldable biasing means within said transverse cavity of said housing, until said first cylindrical portion of said transverse plunger is removed from said cavity formed in said axial plunger, whereat said yieldable biasing means applied to said power shaft urges said power shaft to translate axially into its engaged position with respect to said hub assembly, and, through the abutting contact of the distal end of said power shaft with the second end of said axial plunger, causes said axial plunger to translate to its initial position within said housing, said shoulder on said bearing surface precluding inadvertent translation of said axial, plunger to the position of the circular assembly hole therethrough.

10. A quick disengagement apparatus as claimed in claim 9 further comprising:

means, adapted to mate with said circumferential groove formed on said second portion of said transverse plunger, for slidably sealing said transverse cavity of said housing;

means, adapted to mate with said circumferential groove formed on said axial plunger proximate to the first end face thereof, for slidably sealing said circular cylindrical hole formed axially through said housing at an end thereof proximate the distal end of the second portion of the housing; and means for sealing the interface between said quick disengagement apparatus and the hub assembly to which it is mounted.

11. A quick disengagement apparatus for selectively controlling a conventional disengageable power wheel assembly wherein an axially shiftable power shaft may be translated between a first position whereat said power shaft is operatively engaged with an associated hub assembly to enable mutual coaxial rotation, and, in opposition to a yieldable bias acting axially on said power shaft so as to maintain said engagement, a second position whereat said power shaft is disengaged from its associated hub assembly to enable independent coaxial rotations thereof, said quick disengagement apparatus comprising:

a housing, substantially configured to have a first portion in the form of a cylinder having a circular face and a circular base parallelly spaced apart from said face by an appropriate axial extent, said face having a diameter less than or equal to the diameter of said base, a second portion formed as a right circular cylinder extending outwardly from, and centered with respect to, said face, and a plurality of tapered flutes extending from the periphery of said face to a distal end of said second portion;

a circular cylindrical hole formed axially through said first and said second portions of said housing;

a substantially circular cylindrical cavity formed on a diameter of said first portion, disposed subsantially between said base and said face, said cavity being closed at one end thereof;

at least two circular cylindrical holes formed through said first portion of said housing from said face through said base such that their axes are parallel with, and equally spaced apart from, the axis of said housing, said holes being appropriately disposed so as be to situated between said flutes, and adapted to align wit means, associated with said hub assembly, for mountig said housing to said hub assembly;

a transverse plunger, integrally formed to have a first portion configured as a right circular cylinder, a second portion configured as a right circular cylinder, and a right circularly cylindrical shaft portion extending therebetween, said first and said second portions having substantially equal diameters greater than a diameter of sad shaft portion, said first and said second portions being adapted to slidably translate, in their axial direction, within said transverse cavity formed in said housing, said first portion being proximate to the closed end of said cavity, and said second portion including a circumferential groove formed therein;

yieldable biasing means, disposed within said transverse cavity of said housing between said closed end thereof and said first cylindrical portion of said transverse plunger, for urging said transvers plunger to slide within said cavity in a direction away from said closed end thereof; and an axial plunger, formed substantially as a right circular cylinder having a diameter adapted to slidably translate, in an axial direction, through said axial hole formed through said housing, said axial plunger having a second end proximate, when said axial plunger is assembled into said housing, to said base of said housing, and a first end face opposed thereto in a direction of said second portion of said housing, said axial plunger having a circumferential groove formed proximate to said first end face and a longitudinal slot formed diametrically through said cylinder, said slot having a width adapted to accept said shaft portion of said transverse plunger in slidable engagement therethrough when the axis of said shaft portion is aligned in the plane of said slot and orthogonal to the longitudinal axis of said axial plunger, said slot terminating, at its end proximate to said first end face of said axial plunger, in a circular assembly hole diametrically formed through said axial plunger, said hole having its axis in a plane bisecting said slot in a longitudinal direction, said hole having a diameter substantially equal to the diameter of said transverse cavity formed in said housing, said hole not intersecting said circumferential groove, said axial plunger having a right circular cylindrical cavity formed therein adjacent to, but not intersecting, said hole, said cavity being formed radially inwardly of the circumferential surface of said axial plunger, so as to form a detent adapted to accept said first cylindrical portion of said transverse plunger, said axial plunger further having a substantially planar bearing surface formed inwardly of its circumference adjacent each side of said slot, said bearing surfaces extending longitudinally of said slot from said right circular cylindrical cavity to a shoulder formed at the obverse end of said slot proximate said second and of said axial plunger;

said housing, said axial plunger, said transverse plunger and said yieldable biasing means cooperating for assembly such that said axial plunger my be translated within the axial bore through said housing and rotationally aligned with respect to said housing such that said assembly hole formed on the end of said slot proximate to said first end face said axial plunger is aligned with said transverse cavity formed in said housing and said bearing surfaces are aproximate to the closed end of said transverse cavity, whereat said yieldable biasing means may be inserted into said transverse cavity so as to abut against said closed end thereof and said transverse plunger may be slidably translated into said transverse cavity such that said first cylindrical portion thereof abuts against said yieldable biasing means, whence an external force applied to second cylindrical portion of said transverse plunger so as to cause said transverse plunger to translate in oposition to said yieldable biasing means translates said first cylindrical portion of said transverse plunger within said transverse cavity until said first cylindrical portion of said transverse plunger has been translated completely through said axial plunger, whereat said axial plunger may be translated tnrough said housing toward said base such that said slot of said axial plunger slidably engages said shaft portion of said transverse plunger, whereat removal of the force applied to said second cylindrical potion of the transverse plunger enables said yieldable biasing within said transverse cavity of the housing to urge the first cylindrical portion of the transverse plunger into slidable contact with said bearing surface of said axial plunger adjacent said slot and said housing, said axial plunger, said transverse plunger, and said yieldable biasing means cooperating, on mounting of the quick disengagement assembly, a so assembled, to its associated hub assembly, such that said second end of said axial plunger is in abutting contact with a distal end of said power shaft when said power shaft is in its fully engaged position with respect to said hub assembly, said axial plunger being positioned such that the first portion of the transverse plunger is proximate the shoulder of the bearing surface at the obverse end of the slot through the axial plunger, whereat an extenal force may be applied to said first end face of said axial plunger so as to cause said axial plunger and said power shaft to translate, in opposition to the yieldable bias applied to said power shaft, from said engaged position to a position whereat said power shaft is disengaged from said hub assembly, at which position said yieldable biasing means within said transverse cavity urges said first cylindrical portion of said transverse plunger into the cavity formed at the obverse end of the slot of the axial plunger so as to retain the axial plunger in the disengaged position, said engaged condition being restored through translation of said transverse plunger, through application of a second external force in opposition to said yieldable biasing means within said transverse cavity of said housing, until said first cylindrical portion of said transverse plunger is removed from said cavity formed in said axial plunger, whereat said yieldable biasing means applied to said power shaft urges said power shaft to translate axially into its engaged position with respect to said hub assembly, and, through the abutting contact of the distal end of said power shaft with the second end of said axial plunger, causes said axial plunger to translate to its initial position within said housing.

12. A quick disengagement apparatus as claimed in claim 11, further comprising:

means, adapted to mate with said circumferential groove formed on said second portion of said transverse plunger, for slidably sealing said transverse cavity of said housing;

means, adapted to mate with said circumferential groove formed on said axial plunger proximate to the first end face thereof, for slidably sealing said circular cylindrical hole formed axially through said housing at an end thereof proximate the distal end of the second portion of the housing; and means for sealing the interface between said quick disengagement apparatus and the hub assembly to which it is mounted.

* * * * *

UNITED STATES PATENT AND TRADEMARK OFFICE
CERTIFICATE OF CORRECTION

PATENT NO.   :   4,692,049

DATED        :   September 8, 1987

INVENTOR(S)  :   James L. Engle

It is certified that error appears in the above-identified patent and that said Letters Patent is hereby corrected as shown below:

Column 1, Line 30 after "carried by the" insert --hub, or alternatively, the axle may have a splined end--.

Column 7, Line 3, "tranverse" should be -- transverse --.
Column 7, Line 57, "witn" should be -- with --.
Column 8, Line 28, "tne" should be --the--.
Column 8, Line 30, "th" should be -- the --.
Column 9, Line 18, "recedes" should be -- precedes --.
Column 10, Line 44, "cndition" should be -- condition --.
Column 10, Line 52, "auses" should be -- causes --.

Column 19, Line 57, "wit" should be -- with --.
Column 19, Line 65, "sad" should be -- said --.
Column 20, Line 7, "transvers" should be -- transverse --.
Column 20, Line 47, "and" should be -- end --.
Column 20, Line 50, "my" should be -- may --.

Column 20, Line 66, "oposition" should be -- opposition --.
Column 21, Line 5, "tnrough" should be -- through --.
Column 21, Line 9, "potion" should be -- portion --.
Column 21, Line 18, "a" should be -- as --.

Signed and Sealed this

Third Day of May, 1988

Attest:

DONALD J. QUIGG

Attesting Officer

Commissioner of Patents and Trademarks